US010481936B2

(12) United States Patent
Tsirkin (10) Patent No.: US 10,481,936 B2
(45) Date of Patent: Nov. 19, 2019

(54) EFFICIENT VIRTUAL MACHINE MEMORY MONITORING WITH HYPER-THREADING (71) Applicant: Red Hat Israel, Ltd., Ra'anana (IL)

(72) Inventor: Michael Tsirkin, Lexington, MA (US)

(73) Assignee: RED HAT ISRAEL, LTD., Ra'anana (IL)

(*) Notice: Subject to any disclaimer, the term of this patent is extended or adjusted under 35 U.S.C. 154(b) by 179 days.

(21) Appl. No.: 15/438,995

(22) Filed: Feb. 22, 2017

(65) Prior Publication Data
US 2018/0239626 A1    Aug. 23, 2018

(51) Int. Cl.
G06F 9/455    (2018.01)
G06F 9/48    (2006.01)

(52) U.S. Cl.
CPC ........ *G06F 9/45558* (2013.01); *G06F 9/4881* (2013.01); *G06F 2009/45575* (2013.01); *G06F 2009/45583* (2013.01)

(58) Field of Classification Search
None
See application file for complete search history.

(56) References Cited

U.S. PATENT DOCUMENTS 7,213,093 B2    5/2007  Hammarlund et al.
8,195,968 B2    6/2012  Rothman et al.
9,098,337 B2    8/2015  Dong et al.
9,256,455 B2    2/2016  Tsirkin et al.
9,792,163 B1*  10/2017  Chrysanthakopoulos ........... G06F 9/541
2005/0091022 A1    4/2005  Levit-Gurevich et al.
2014/0059543 A1*  2/2014  Nassi ...................... H04L 67/10
                                                             718/1
2014/0149633 A1    5/2014  Tsirkin et al.
2014/0149979 A1    5/2014  Tsirkin et al.
2014/0325183 A1*  10/2014  Rozen ..................... G06F 15/76
                                                             712/30
2015/0378762 A1    12/2015  Saladi et al.

OTHER PUBLICATIONS

Anastopoulos et al., Facilitating Efficient Synchronization of Asymmetric Threads on Hyper-Threaded Processors, National Technical University of Athens School of Electrical and Computer Engineering, Apr. 14, 2008 (8 pages).

(Continued)

*Primary Examiner* — Wynuel S Aquino
(74) *Attorney, Agent, or Firm* — K&L Gates LLP (57) ABSTRACT A system and method for efficient virtual machine memory monitoring with hyper-threading includes executing, by a hypervisor executing on a plurality of physical processors, a virtual central processor unit (VCPU) of a virtual machine on a first hyper-thread. The plurality of physical processors include a first physical processor having the first hyper-thread and a second hyper-thread. The virtual machine executes on the first hyper-thread. Then, the second hyper-thread executes a memory monitoring instruction on a designated range of a shared memory to cause the second hyper-thread to stop executing. Then, a guest in the virtual machine updates the designated range of the shared memory by storing a first request in the designated range of the shared memory to wake up the second hyper-thread.

20 Claims, 5 Drawing Sheets (56) References Cited

OTHER PUBLICATIONS

Wahl, Chris, Hyper-Threading Gotcha with Virtual Machine vCPU Sizing, Wahl Network, Sep. 30, 2013, Link: http://wahlnetwork.com/2013/09/30/hyper-threading-gotcha-virtual-machine-vcpu-sizing/ (9 pages).
Performance Best Practices for VMware vSphere® 6.0, VMware, Inc., Jul. 20, 2015 (98 pages).

* cited by examiner

EFFICIENT VIRTUAL MACHINE MEMORY MONITORING WITH HYPER-THREADING

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor. Virtual machines may execute threads.

SUMMARY

The present disclosure provides new and innovative methods and systems for efficient virtual machine memory monitoring with hyper-threading. An example method includes executing, by a hypervisor executing on a plurality of physical processors, a virtual central processor unit (VCPU) of a virtual machine. The plurality of physical processors include a first physical processor having a first hyper-thread and a second hyper-thread. The VCPU executes in the first hyper-thread. Then, the second hyper-thread executes a memory monitoring instruction on a designated range of a shared memory to cause the second hyper-thread to stop executing. Then, a guest in the virtual machine updates the designated range of the shared memory by storing a first request in the designated range of the shared memory to wake up the second hyper-thread.

Additional features and advantages of the disclosed methods and system are described in, and will be apparent from, the following Detailed Description and the Figures.

DETAILED DESCRIPTION OF EXAMPLE EMBODIMENTS

Described herein are methods and systems for efficient virtual machine memory monitoring with hyper-threading.

Hyper-threading technology enables execution of threads in parallel using a single processor. In a processor supporting hyper-threading, a single physical processor appears as two logical processors (hyper-threads). Because the processor resources are shared and the architectural state is duplicated for the two hyper-threads, communication through shared memory between the two hyper-threads within the same processor is relatively cheap and efficient. However, because the central processing unit (CPU) execution engine is shared between multiple hyper-threads, unless one of the hyper-threads is halted, the other hyper-thread typically executes at best at half the maximum speed due to the execution engine conflict.

In order to preserve power resources and lower overhead usage, physical processors and/or logical processors (hyper-threads) may utilize memory monitoring instructions designating a range of memory that allow the physical processor to stop instruction execution. The physical/logical processor executing the monitoring instruction may be blocked from further execution and enter a wait state until there is a change to the designated memory by another physical processor or an inter-processor interrupt is received. Using the x86 instruction set architecture as an example, this feature includes a MONITOR instruction and an MWAIT instruction. The MONITOR instruction causes the processor hardware to monitor a range of memory addresses designated by the MONITOR instruction. If there is a change to the designated memory (e.g., data storing), a signal is triggered within the processor hardware. This signal may be used by the MWAIT instruction. The MWAIT instruction causes the processor to enter a halt state until data has been written to a memory address within the range designated by the MONITOR instruction. If a processor is in a halt state as a result of the MWAIT instruction, a change to the designated memory may bring that processor out of the halt state.

Generally, virtual machine guests send a notification to a hypervisor when the virtual machine guests forward a request to the hypervisor. In order to process the request, the physical processor, on which the virtual machine guest was running, may switch from a guest mode to a hypervisor mode, causing a virtual machine (VM) exit, which is one of the major sources of virtualization overhead. Generally, latency of forwarding requests from virtual machine guests to a hypervisor is one of the biggest challenges in virtualization efficiency. While batching approaches may partially solve the problem by reducing the number of such notifications, this is still typically not effective for a system with demanding workloads, such as a latency sensitive network function virtualization (NFV) system. One way to reduce this latency is using a memory polling technique, where a virtual machine guest stores requests in a guest memory, and a hypervisor repeatedly checks (i.e., polls) the guest memory for new requests and executes the requests.

Unfortunately, this memory polling technique does not work well in a hyper-threading system. For example, a hypervisor scheduler may execute a virtual central processing unit (VCPU) on a hyper-thread of a physical processor and schedule a polling and request executing task on a sibling hyper-thread in the same physical processor. However, this may slow down the VCPU because the sibling hyper-thread is not halted while the other hyper-thread is executing the VCPU, which causes CPU execution engine conflicts. One way to avoid the CPU execution engine conflict is executing the guest on one hyper-thread of a physical processor and scheduling the polling and request executing task on a hyper-thread in a different physical processor. However, this approach may require expensive cache synchronization when updating the guest memory.

Aspects of the present disclosure may address the above noted deficiencies. In an example, when a hypervisor starts executing a VCPU of a virtual machine in a first hyper-thread of a first physical processor, before switching to a guest mode, the hypervisor may execute a monitoring task in a second hyper-thread of the first physical processor. The monitoring task may cause the second hyper-thread to execute a memory monitoring instruction (e.g., MONITOR and MWAIT instructions) on a designated range of a shared memory. This may cause the second hyper-thread to be in a wait/halt state.

When a guest of the virtual machine executing on the first hyper-thread stores a request in the designated range of the shared memory, the second hyper-thread may be brought out of the wait/halt state. Then, the monitoring task may cause the second hyper-thread to notify a third hyper-thread in a second physical processor to wake up a request executing task and execute the request stored in the shared memory. When receiving the notification, the third hyper-thread may wake up the request executing task and execute the request stored in the designated range of the shared memory. In an example, the third hyper-thread may be in a hypervisor mode when receiving the notification and executing the requests in the shared memory. Then, the monitoring task may cause the second hyper-thread to execute the memory monitoring instruction again if there are no other tasks to be executed on the second hyper-thread. In this way, executing the monitoring task in the second hyper-thread may have the same effect of polling (repeatedly checking) the shared memory when the second hyper-thread is actually in a wait state most of the time, which improves the system performance.

In an example, other physical processors in the system may execute a guest respectively, and the above described third hyper-thread may be shared by multiple guests to execute requests from the multiple guests on behalf of the guests. In an example, each physical processor executing a guest may be implemented in the same way as explained above for the first physical processor (e.g., one hyper-thread executing a guest and the other hyper-thread executing the monitoring task). In this case, since the guest, which stores requests, and the monitoring task are executed in hyper-threads in the same physical processor, the system of the present disclosure may advantageously operate without expensive cache synchronization. In another example, there may be one hyper-thread executing the monitoring task in the system on behalf of all the other guests. In this case, the other guests may store requests in the same shared memory and this single hyper-thread may notify the shared third hyper-thread about the requests from multiple guests for processing.

Aspects of the present disclosure may advantageously reduce the CPU execution engine conflict problem between multiple hyper-threads in the same physical processor and reduce CPU utilization because one of the hyper-threads in the same physical processor will be in a halt state most of the time. Aspects of the present disclosure are also capable of executing the request executing task on the shared third hyper-thread (e.g., in the hypervisor mode) while executing multiple guests on other physical processors and, thus, do not require a VM exit to process the requests. Also, since the shared third hyper-thread may execute the requests on behalf of multiple guests, other physical processors can be freed up for other tasks, such as executing other virtual machines.

Additional features and advantages of the disclosed method, system, and apparatus are described below.

Figure 1:
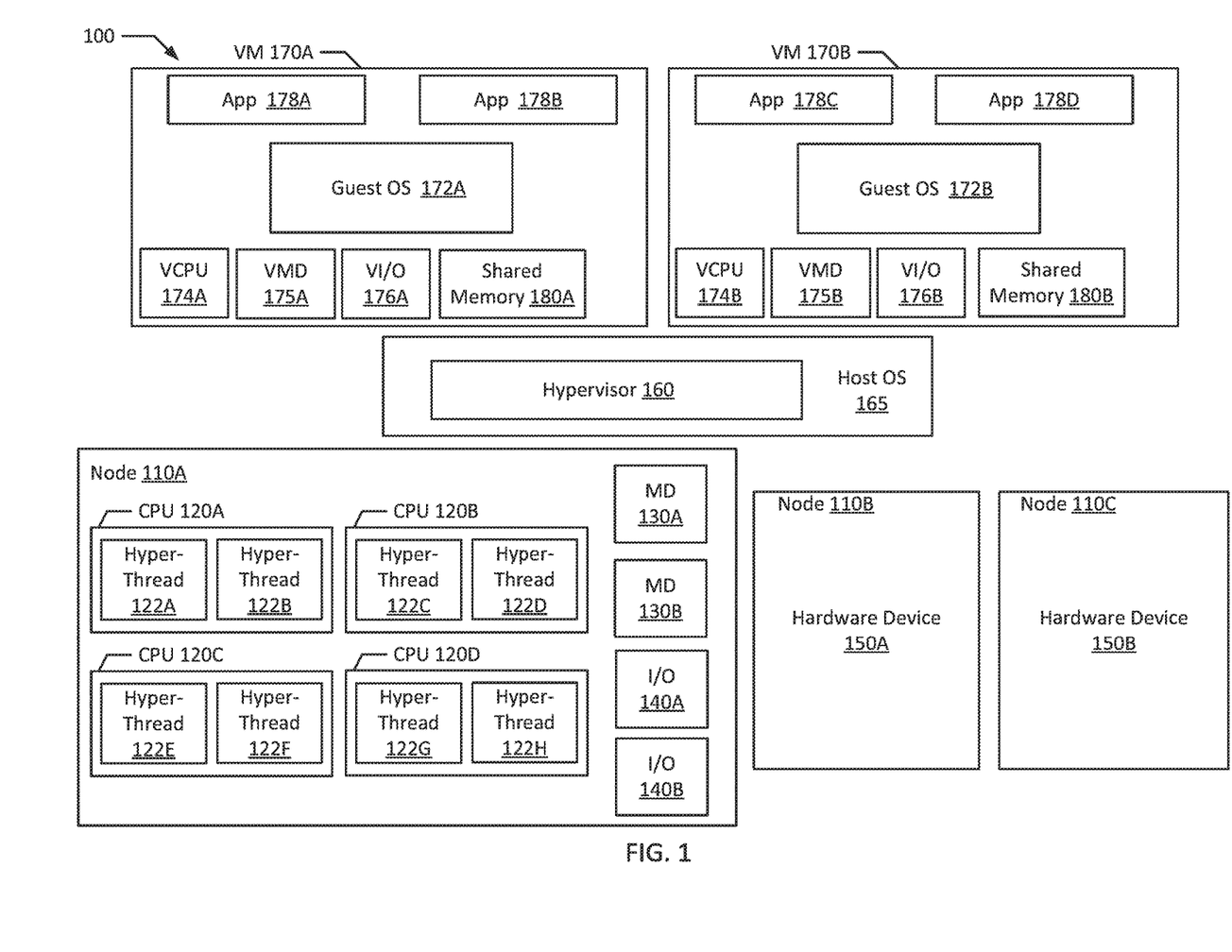
FIG. 1 is a block diagram of an example system for efficient virtual machine memory monitoring with hyper-threading according to an example embodiment of the present disclosure.

FIG. 1 depicts a high-level component diagram of an example system 100 in accordance with one or more aspects of the present disclosure. The computer system 100 may include one or more interconnected nodes 110A-C. The node 110A may in turn include multiple physical processors (CPU 120A-D) communicatively coupled to memory devices (e.g., MD 130A-B) and input/output devices (e.g., I/O 140A-B). Each node 110B-C may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processor 120 refers to a device capable of executing instructions encoding arithmetic, logical, and/or I/O operations. In one illustrative example, a processor may follow the Von Neumann architectural model and may include an arithmetic logic unit (ALU), a control unit, and a plurality of registers. In a further aspect, a processor may provide a hyper-threading technology where a single physical processor may appear as two logical processors (e.g., hyper-threads 122A-B; hyper-threads 122C-D, hyper-threads 122E-F; hyper-threads 122G-H). In a processor (e.g., CPU 120A) using the hyper-threading technology, the physical processor resources are shared between the two logical processors and the architectural state is duplicated for the two logical processors (e.g., 122A and 122B). In an example, each processor may include more than two logical processors (e.g., three or four hyper-threads).

As discussed herein, a memory device 130A-B refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processor 120 may be interconnected using a variety of techniques, including a point-to-point processor interconnect, and a system area network, such as an Ethernet-based network. Local connections within each node 110A-C, including the connections between a processor 120 and a memory device 130 and between a processor 120 and an I/O device 140 may be provided by one or more local buses of suitable architecture, for example, a PCI. As used herein, a device of the host OS 165 (or "host device") may refer to CPU 120, MD 130, I/O 140, a software device, and/or hardware device 150A-B.

As noted above, the system 100 may run multiple virtual machines (e.g., VM 170A-B), by executing a software layer (e.g., hypervisor 160) above the hardware and below the virtual machines 170A-B, as schematically shown in FIG. 1. In an example embodiment, the hypervisor 160 may be a component of the host operating system 165 executed by the system 100. In another example embodiment, the hypervisor 160 may be provided by an application running on the operating system 165 or may run directly on the system 100 without an operating system beneath it. The hypervisor 160 may virtualize the physical layer, including processors, memory, and I/O devices, and present this virtualization to virtual machines 170A-B as devices, including virtual processors (e.g., VCPU 174A-B), virtual memory devices (e.g., VMD 175A-B and/or Shared Memory 180A-B), and/or virtual I/O devices (e.g., VI/O 176A-B).

In an example embodiment, a virtual machine 170A-B may execute a guest operating system 172A-B that may utilize the underlying VCPU 174A-B, VMD 175A-B, shared memory 180A-B, and VI/O devices 176A-B. One or more applications 178A-D may be running on a virtual machine 170A-B under the guest operating system 172A-B.

A virtual machine 170A-B may run any type of dependent, independent, compatible, and/or incompatible applications on the underlying hardware and OS 165. In an example embodiment, applications (e.g., App 178A-D) executing on a virtual machine 170A-B may be dependent on the underlying hardware and/or OS 165. In another example embodiment, applications 178A-D executing on a virtual machine 170A-B may be independent of the underlying hardware and/or OS 165. For example, application 178A executing on a first virtual machine 170A may be dependent on the underlying hardware and/or OS 165 while application 178B executing on a second virtual machine 170B may be independent of the underlying hardware and/or OS 165. Additionally, applications 178A-D executing on a virtual machine 170A-B may be compatible with the underlying hardware and/or OS 165. In an example embodiment, applications 178A-D executing on a virtual machine 170A-B may be incompatible with the underlying hardware and/or OS 165. For example, application 178A executing on one virtual machine 170A may be compatible with the underlying hardware and/or OS 165, while application 178C executing on another virtual machine 170B may be incompatible with the underlying hardware and/or OS 165. In an example embodiment, a device may be implemented as a virtual machine 170.

In an example embodiment, a virtual machine 170A-B may include a virtual processor (VCPU) 174A-B. Processor virtualization may be implemented by the hypervisor 160 scheduling time slots on one or more physical processors 120 such that from the guest operating system's perspective, those time slots are scheduled on a virtual processor 174A-B.

Figure 2:
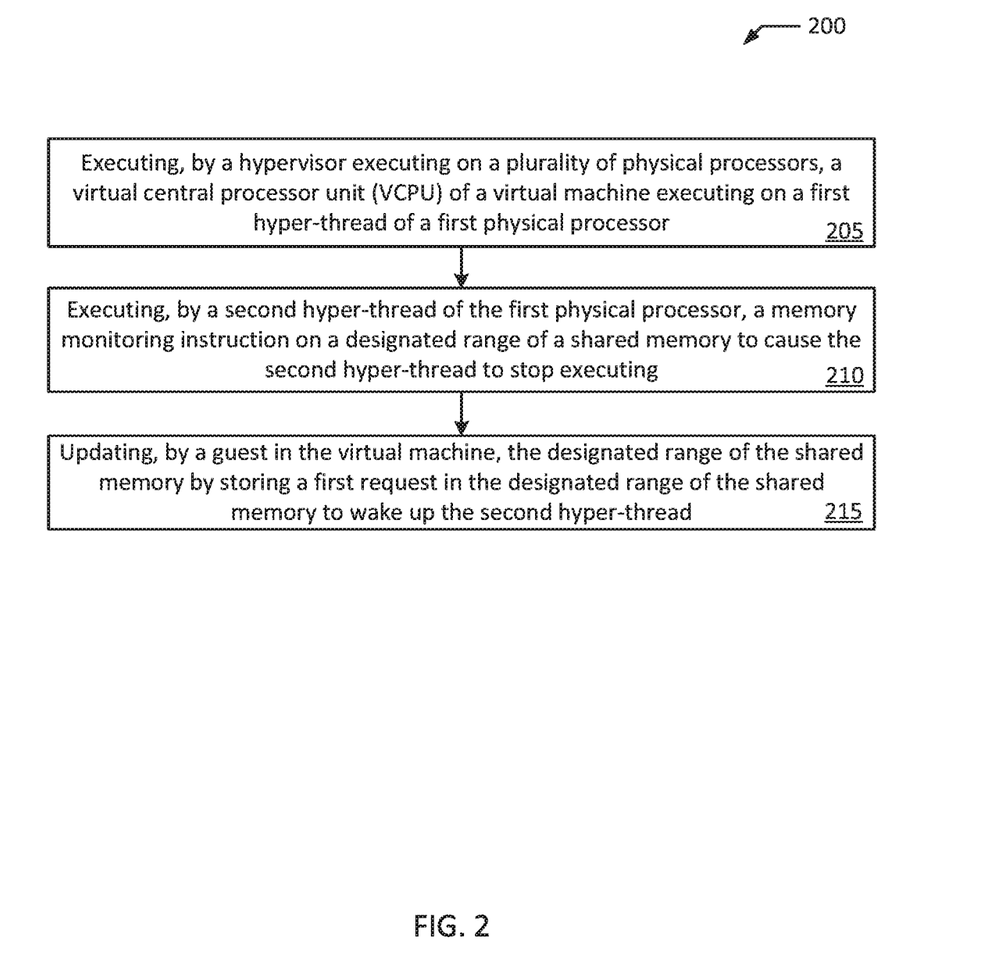
FIG. 2 is a flowchart illustrating an example method for efficient virtual machine memory monitoring with hyper-threading according to an example embodiment of the present disclosure.

FIG. 2 shows a flowchart of an example method 200 for efficient virtual machine memory monitoring with hyper-threading. Although the example method 200 is described with reference to the flowchart illustrated in FIG. 2, it will be appreciated that many other methods of performing the acts associated with the method may be used. For example, the order of some of the blocks may be changed, certain blocks may be combined with other blocks, and some of the blocks described are optional.

In the illustrated example embodiment, a hypervisor executing on a plurality of physical processors may execute a VCPU of a virtual machine which is executing on a first hyper-thread of a first physical processor (block 205). For example, a hypervisor 160 executing on a plurality of physical processors CPU 120A-D may execute a VCPU 174A of a virtual machine 170A executing on a first hyper-thread 122A of a first physical processor CPU 120A. For example, the plurality of physical processors 120A-D may include the first physical processor CPU 120A having the first hyper-thread 122A and a second hyper-thread 122B. The virtual machine may execute in the first hyper-thread. For example, the virtual machine 170A may execute in the first hyper-thread 122A.

Then, a second hyper-thread of the first physical processor may execute a memory monitoring instruction on a designated range of memory locations in a shared memory to cause the second hyper-thread to stop executing (block 210).

For example, the second hyper-thread 122B may execute a memory monitoring instruction on a designated range of memory locations in a shared memory 180A to cause the second hyper-thread 122B to stop executing. Then, a guest in the virtual machine may update the designated range of the memory locations in the shared memory by storing a first request in the designated range of the memory locations in the shared memory to wake up the second hyper-thread (block 215). For example, a guest in the virtual machine 170A may update the designated range of the memory locations in the shared memory 180A by storing a first request in the designated range of the memory locations in the shared memory 180A to wake up the second hyper-thread 122B. As used herein, a guest may refer to any software running within the virtual machines (e.g., VM 170A-B), such as guest operating systems (e.g., guest OS 172A-B) and/or applications running on the guest operating systems (e.g., Applications 178A-D), and/or may refer to guest firmware running within the virtual machines (e.g., VM 170A-B).

Figure 3A:
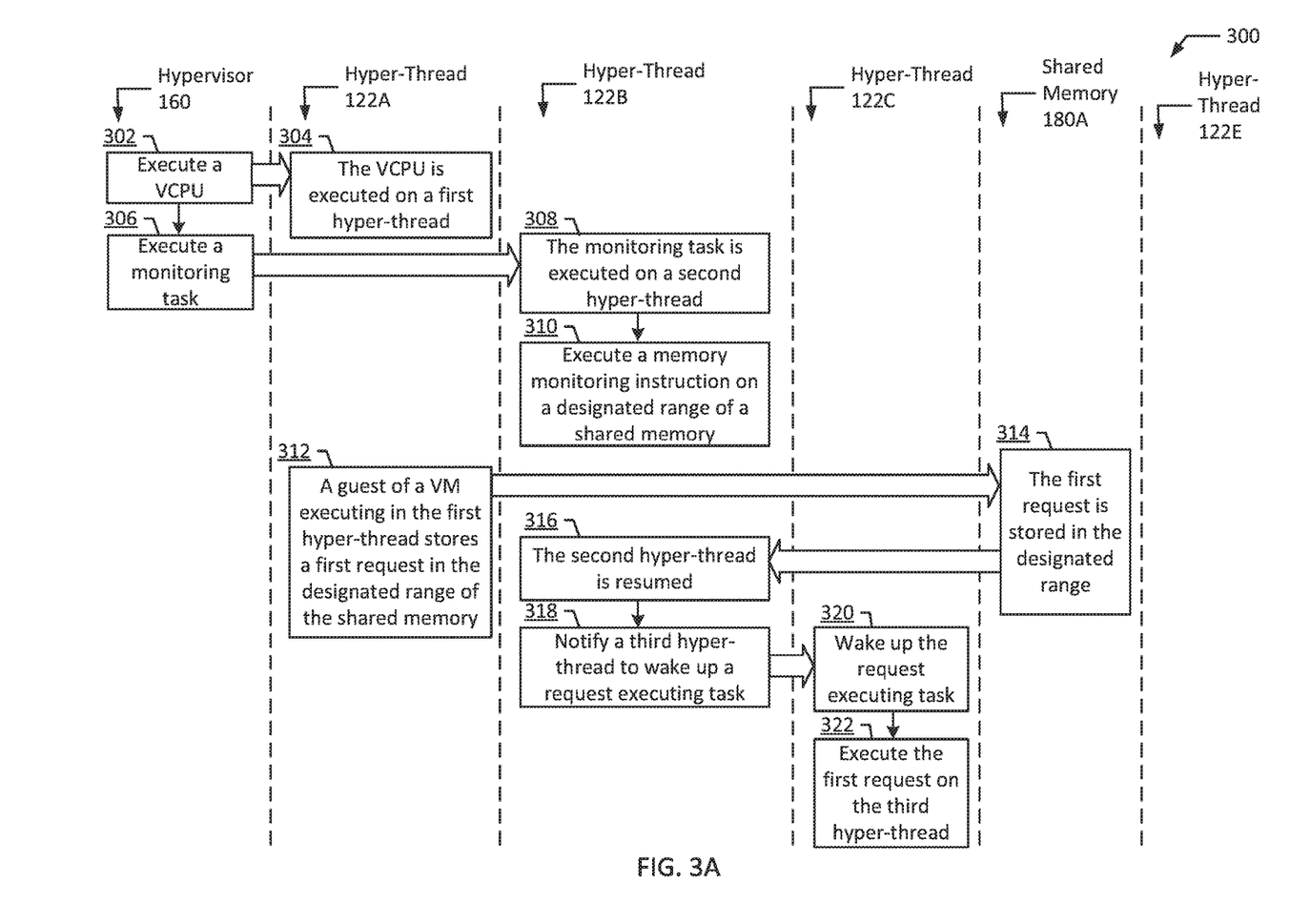
FIGS. 3A and 3B are a flow diagram illustrating an example process for efficient virtual machine memory monitoring with hyper-threading according to an example embodiment of the present disclosure.
Figure 3B:
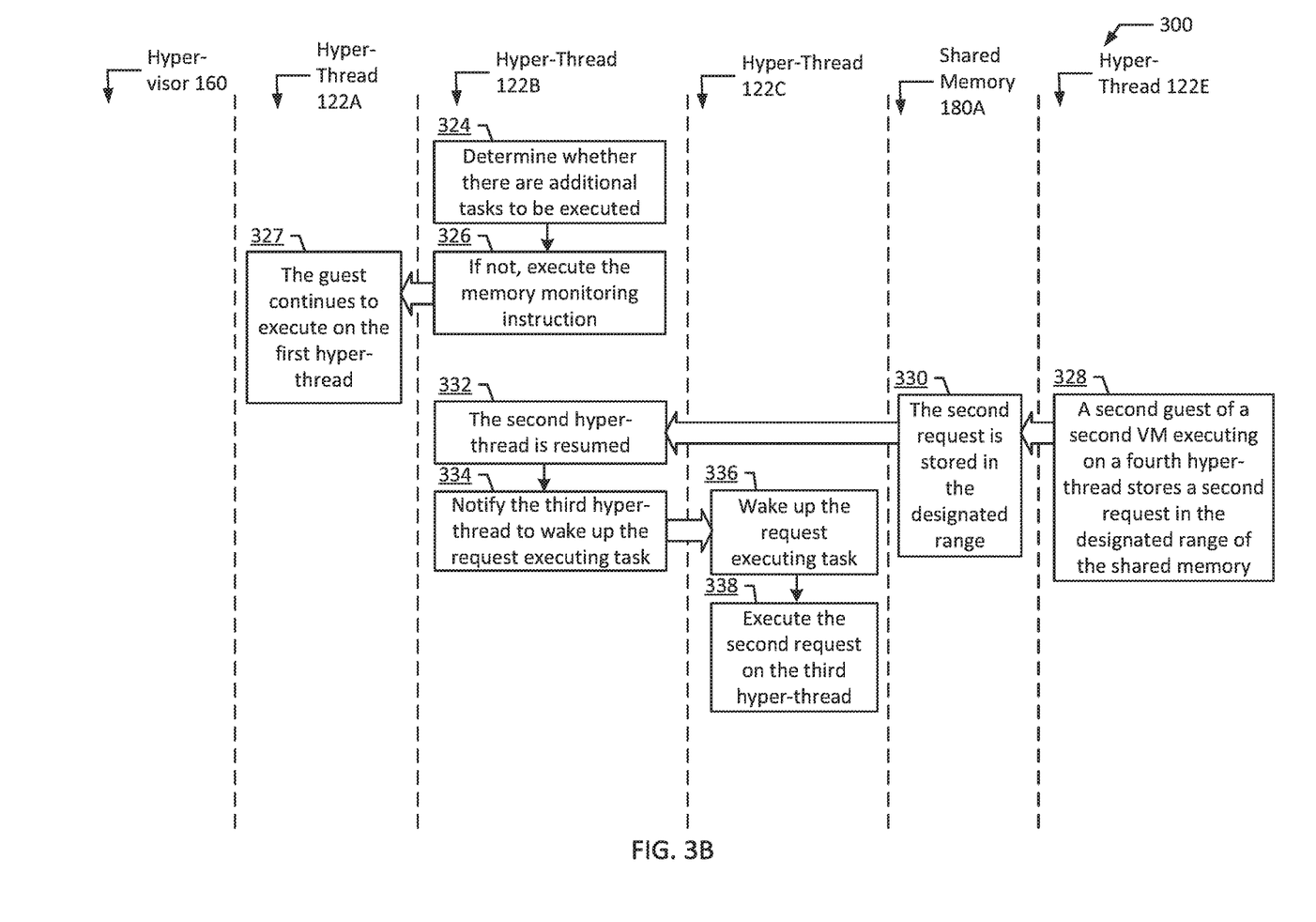

FIGS. 3A and 3B illustrate a flow diagram of an example method 300 for efficient virtual machine memory monitoring with hyper-threading according to an example embodiment of the present disclosure. Although the example method 300 is described with reference to the flow diagram illustrated in FIG. 3, it will be appreciated that many other methods of performing the acts associated with the method may be used. For example, the order of some of the blocks may be changed, certain blocks may be combined with other blocks, and some of the blocks described are optional. The method 300 may be performed by processing logic that may include hardware (circuitry, dedicated logic, etc.), software, or a combination of both. For example, the method 300 may be performed by a system including hypervisor 160, first hyper-thread 122A, second hyper-thread 122B, third hyper-thread 122C, shared memory 180A, and fourth hyper-thread 122E communicating or interacting with each other.

In the illustrated example embodiment, a hypervisor 160 may execute a VCPU 174A of a virtual machine 170A in a first hyper-thread 122A of a physical processor 120A (blocks 302 & 304). Then, the hypervisor 160 may execute a monitoring task in a second hyper-thread 122B of the physical processor 120B (blocks 306 & 308). In an example, the hypervisor 160 may execute the monitoring task in the second hyper-thread 122B after executing the VCPU 174, but prior to entering a guest mode. In an example, the monitoring task may include a memory monitoring instruction (e.g., MONITOR & MWAIT instructions). The second hyper-thread 122B may execute the memory monitoring instruction on a designated range of a shared memory 180A (block 310). For example, the second hyper-thread 122B may execute MONITOR and MWAIT instructions on a designated range of the shared memory 180A. This may cause the second hyper-thread 122B to stop executing.

In an example, a guest of the virtual machine 170A may store a first request in the designated range of the shared memory 180A (blocks 312 & 314). Examples of a request may include a request to transmit a network packet or a request to read some data from a disk. After the designated range of the shared memory 180A is updated when the first request is stored, the second hyper-thread 122B may be resumed (block 316). That is, the second hyper-thread 122B was in a halt state as a result of the memory monitoring instruction, and this change to the designated memory location may bring the second hyper-thread 122B out of the halt state. When the second hyper-thread 122B is out of the halt state, the second hyper-thread 122B may notify a third hyper-thread 122C of a second physical processor 120B to wake up a request executing task (block 318). In an example, the monitoring task may include an instruction to cause the second hyper-thread 122B to notify the third hyper-thread 122C to wake up the request executing task after being woken up. In an example, the second hyper-thread 122B may notify the third hyper-thread 122C to wake up the request executing task by sending an inter-processor interrupt to the third hyper-thread 122C.

In another example, the second hyper-thread 122B may notify the third hyper-thread 122C to wake up the request executing task by executing a write instruction into a second designated range of memory locations in the shared memory 180A, which the third hyper-thread 122C is monitoring. For example, the third hyper-thread 122C may execute a memory monitoring instruction (MONITOR and MWAIT instructions) on the second designated range of memory locations in the shared memory 180A, which may cause the third hyper-thread 122C to enter a halt state. In another example, instead of executing the memory monitoring instruction, the third hyper-thread 122C may poll (i.e., continuously check) the second designated range of memory locations in the shared memory 180A. When the write execution is executed on the second designated range of memory locations in the shared memory 180A, the third hyper-thread may be woken up and wake up the request executing task. In an example, this memory location may be placed in any suitable location of the memory (e.g., 130A-B) accessible by the second hyper-thread 122B and/or the third hyper-thread 122C.

In an example, responsive to receiving the notification, the third hyper-thread 122C may wake up the request executing task (block 320). In an example, the request executing task may include an instruction to execute/process any requests in the designated range of the shared memory 180A. Then, the third hyper-thread 122C may execute the first request in the designated range of the shared memory 180A (block 322).

In an example, the monitoring task may include an instruction to copy any requests in the designated range of the shared memory 180A to a memory location accessible to the request executing task. In this case, the second hyper-thread 122B, after being out of the halt state, may copy the first request stored in the designated range of the shared memory 180A to a memory location accessible to the request executing task based on the instruction in the monitoring task. Then, the third hyper-thread 122C may execute the requests (e.g., the first request and any additional requests in the designated range) in the memory location accessible to the request executing task. In an example, this memory location accessible to the request executing task may be more closely located to the third hyper-thread 122C such that it may be faster to execute requests from this memory location.

In an example, after notifying the third hyper-thread 122C to wake up the request executing task, the second hyper-thread 122B may determine whether there are additional tasks (e.g., other than the monitoring task) to be executed (block 324). In an example, this additional task may include a task related to maintenance of the system. If there are no additional tasks to be executed, the second hyper-thread 122B may execute the memory monitoring instruction, causing the second hyper-thread to stop executing again (block 326). In an example, the guest of the virtual machine 170A may continue to execute in the first hyper-thread 122A after the second hyper-thread 122B executed the memory monitoring instruction (block 327).

In an example, a second guest in a second virtual machine 170B may store a second request in the designated range of the shared memory 180A (blocks 328 & 330). This may cause the second hyper-thread 122B to be resumed (block 332). That is, the second hyper-thread 122B was in a halt state as a result of the memory monitoring instruction executed at block 326, and this change to the designated memory location may bring the second hyper-thread 122B out of the halt state. This second virtual machine 170B may be executed in a fourth hyper-thread 122E of a third physical processor 120C. Then, the second hyper-thread 122B may notify the third hyper-thread 122C to wake up the request executing task (block 334). Then, the third hyper-thread 122C may wake up the request executing task (block 336) and execute the second request stored in the designated memory location of the shared memory 180A (block 338).

In another example, the hypervisor 160 may execute the monitoring task in a fifth hyper-thread 122F of the third physical processor 120C when executing a second VCPU 174B of the second virtual machine 170B. Then, the fifth hyper-thread 122F may execute the memory monitoring instruction on another designated range of a second shared memory 180B. Then, the second guest in the second virtual machine 170B may store the second request in that designated range of the second shared memory 180B, causing the fifth hyper-thread 122F to be resumed. Then, the fifth hyper-thread 122F may notify the third hyper-thread 122C to wake up a request executing task. Then, the third hyper-thread 122C may wake up the request executing task and execute the second request stored in the designated memory location of the shared memory 180B.

Figure 4:
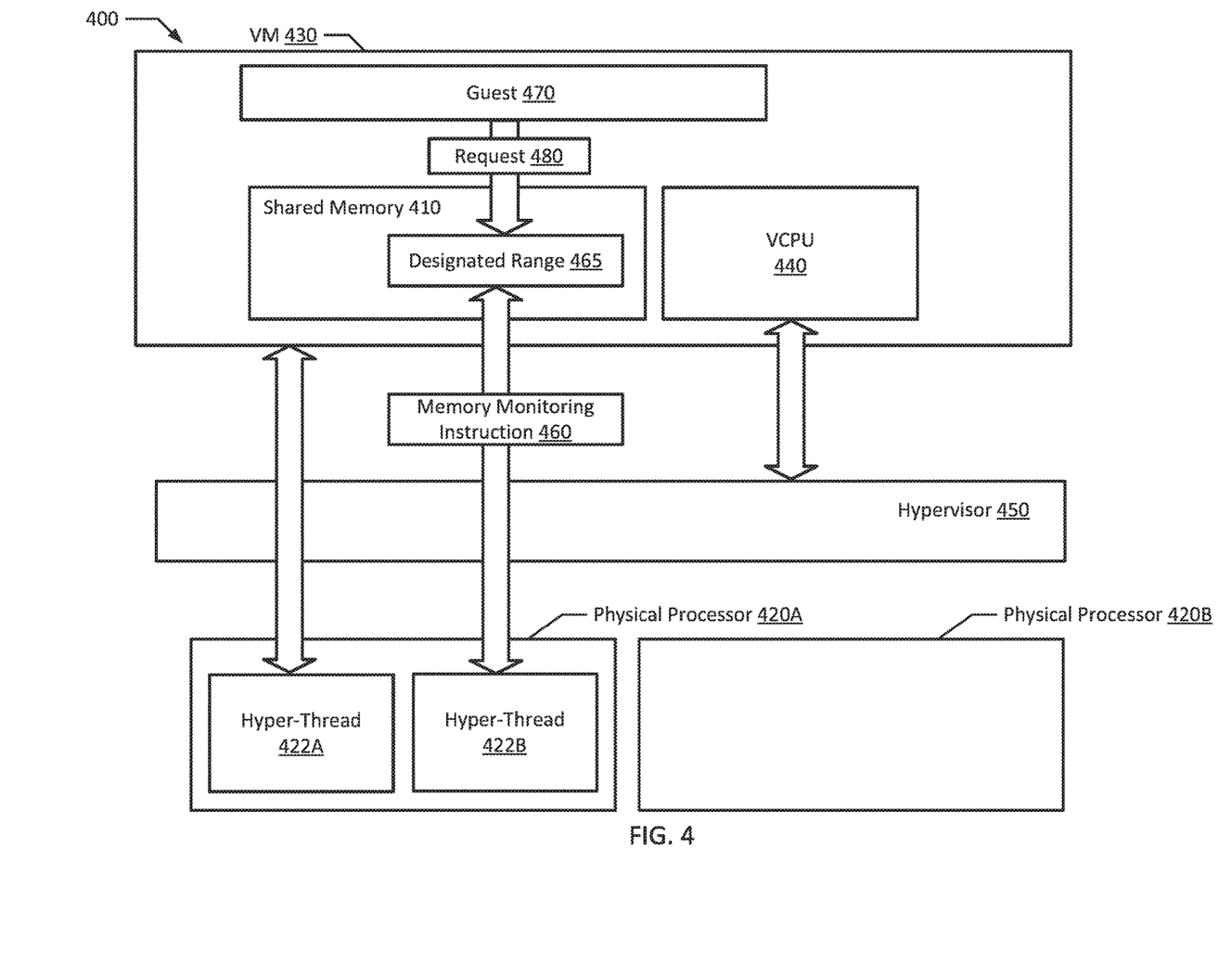
FIG. 4 is a block diagram of an example system according to an example embodiment of the present disclosure.

FIG. 4 shows a block diagram of an example system 400 according to an example of the present disclosure. As illustrated in FIG. 4, an example system 400 may include a shared memory 410 and a plurality of physical processors 420A-B in communication with the shared memory 410. The plurality of physical processors 420A-B may include a first physical processor 420A having a first hyper-thread 422A and a second hyper-thread 422B. The system 400 includes a virtual machine 430 to execute in the first hyper-thread 422A, and the virtual machine 430 may include a VCPU 440. The system 400 also includes a hypervisor 450 to execute on the plurality of physical processors 420A-B to execute the VCPU 440. The second hyper-thread 422B may execute a memory monitoring instruction 460 on a designated range 465 of the shared memory 410 to cause the second hyper-thread 422B to stop executing. Then, a guest in the virtual machine 430 may update the designated range 465 of the shared memory 410 by storing a request 480 in the designated range 465 of the shared memory 410 to wake up the second hyper-thread 422B.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The example embodiments may be embodied in the form of computer-implemented processes and apparatuses for practicing those processes. An embodiment may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An embodiment may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising: executing, by a hypervisor executing on a plurality of physical processors, a virtual central processor unit (VCPU) of a virtual machine, wherein the plurality of physical processors include a first physical processor having a first hyper-thread and a second hyper-thread, wherein the VCPU executes on the first hyper-thread; executing, by the second hyper-thread, a memory monitoring instruction on a designated range of a shared memory to cause the second hyper-thread to stop executing; and updating, by a guest in the virtual machine, the designated range of the shared memory by storing a first request in the designated range of the shared memory to wake up the second hyper-thread, wherein the first request is processed by a third hyper-thread.

2. The method of claim 1, wherein the plurality of physical processors include a second physical processor having the third hyper-thread, and the method further comprises: notifying, by the second hyper-thread, the third hyper-thread to wake up a request executing task in the third hyper-thread responsive to updating the designated range of the shared memory; and responsive to receiving the notification, waking up, by the third hyper-thread, the request executing task, wherein the request executing task includes an instruction to execute the first request in the designated range of the shared memory.

3. The method of claim 2, wherein notifying the third hyper-thread to wake up the request executing task includes sending, by the second hyper-thread, an inter-processor interrupt to the third hyper-thread.

4. The method of claim 2, wherein notifying the third hyper-thread to wake up the request executing task includes executing, by the second hyper-thread, a write instruction into a second designated range of the shared memory, wherein the third hyper-thread monitors the second designated range of the shared memory.

5. The method of claim 2, further comprising, responsive to waking up the request executing task, executing, by the third hyper-thread, the first request in the designated range of the shared memory.

6. The method of claim 2, further comprising:
copying, by the second hyper-thread, the first request stored in the designated range of the shared memory to a memory location accessible to the request executing task; and
executing, by the third hyper-thread, the first request in the memory location accessible to the request executing task.

7. The method of claim 2, wherein the plurality of physical processors include a third physical processor having a fourth hyper-thread, wherein a second virtual machine executes on the fourth hyper-thread, and wherein the method further comprises updating, by a second guest in the second virtual machine, the designated range of the shared memory by storing a second request in the designated range of the shared memory.

8. The method of claim 7, further comprising executing, by the third hyper-thread, the second request stored in the designated range of the shared memory.

9. The method of claim 1, further comprising executing, by the hypervisor, a monitoring task in the second hyper-thread, wherein the monitoring task includes the memory monitoring instruction.

10. The method of claim 9, further comprising:
determining, by the second hyper-thread, whether there are additional tasks to be executed in the second hyper-thread; and
responsive to determining that there are no additional tasks to be executed, executing, by the second hyper-thread, the memory monitoring instruction.

11. A system comprising: a shared memory; a plurality of physical processors in communication with the shared memory, wherein the plurality of physical processors include a first physical processor having a first hyper-thread and a second hyper-thread; a virtual machine to execute on the first hyper-thread, wherein the virtual machine includes a virtual central processor unit (VCPU); and a hypervisor to execute on the plurality of physical processors to execute the VCPU on the first hyper-thread, wherein the second hyper-thread executes a memory monitoring instruction on a designated range of the shared memory to cause the second hyper-thread to stop executing, wherein a guest in the virtual machine updates the designated range of the shared memory by storing a first request in the designated range of the shared memory to wake up the second hyper-thread, wherein the first request is processed by a third hyper-thread.

12. The system of claim 11, wherein the plurality of physical processors include a second physical processor having the third hyper-thread, wherein the second hyper-thread notifies the third hyper-thread to wake up a request executing task in the third hyper-thread responsive to updating the designated range of the shared memory, wherein responsive to receiving the notification, the third hyper-thread wakes up the request executing task, and wherein the request executing task includes an instruction to execute the first request in the designated range of the shared memory.

13. The system of claim 12, wherein notifying the third hyper-thread to wake up the request executing task includes sending, by the second hyper-thread, an inter-processor interrupt to the third hyper-thread.

14. The system of claim 12, wherein notifying the third hyper-thread to wake up the request executing task includes executing, by the second hyper-thread, a write instruction into a second designated range of the shared memory, wherein the third hyper-thread monitors the second designated range of the shared memory.

15. The system of claim 12, wherein responsive to waking up the request executing task, the third hyper-thread executes the first request in the designated range of the shared memory.

16. The system of claim 12, wherein the second hyper-thread copies the first request stored in the designated range of the shared memory to a memory location accessible to the request executing task, and wherein the third hyper-thread executes the first request in the memory location accessible to the request executing task.

17. The system of claim 12, wherein the plurality of physical processors include a third physical processor having a fourth hyper-thread, wherein a second virtual machine executes on the fourth hyper-thread, and wherein a second guest in the second virtual machine updates the designated range of the shared memory by storing a second request in the designated range of the shared memory and the third hyper-thread executes the second request stored in the designated range of the shared memory.

18. The system of claim 11, wherein the hypervisor executes a monitoring task in the second hyper-thread, wherein the monitoring task includes the memory monitoring instruction.

19. A non-transitory machine readable medium storing instructions, which when executed by a plurality of physical processors, cause the plurality of physical processors to: execute, by a hypervisor executing on the plurality of physical processors, a virtual central processor unit (VCPU) of a virtual machine, wherein the plurality of physical processors include a first physical processor having a first hyper-thread and a second hyper-thread, wherein the VCPU executes on the first hyper-thread; execute, by the second hyper-thread, a memory monitoring instruction on a designated range of a shared memory to cause the second hyper-thread to stop executing; and update, by a guest in the virtual machine, the designated range of the shared memory by storing a first request in the designated range of the shared memory to wake up the second hyper-thread, wherein the first request is processed by a third hyper-thread.

20. The non-transitory machine readable medium of claim 19, wherein the plurality of physical processors include a second physical processor having the third hyper-thread, and the non-transitory machine readable medium further comprises instructions, which when executed by the plurality of physical processors, cause the plurality of physical processors to: notify, by the second hyper-thread, the third hyper-thread to wake up a request executing task in the third hyper-thread responsive to updating the designated range of the shared memory; and responsive to receiving the notification, wake up, by the third hyper-thread, the request executing task, wherein the request executing task includes an instruction to execute the first request in the designated range of the shared memory.

* * * * *